Patented Jan. 16, 1923.

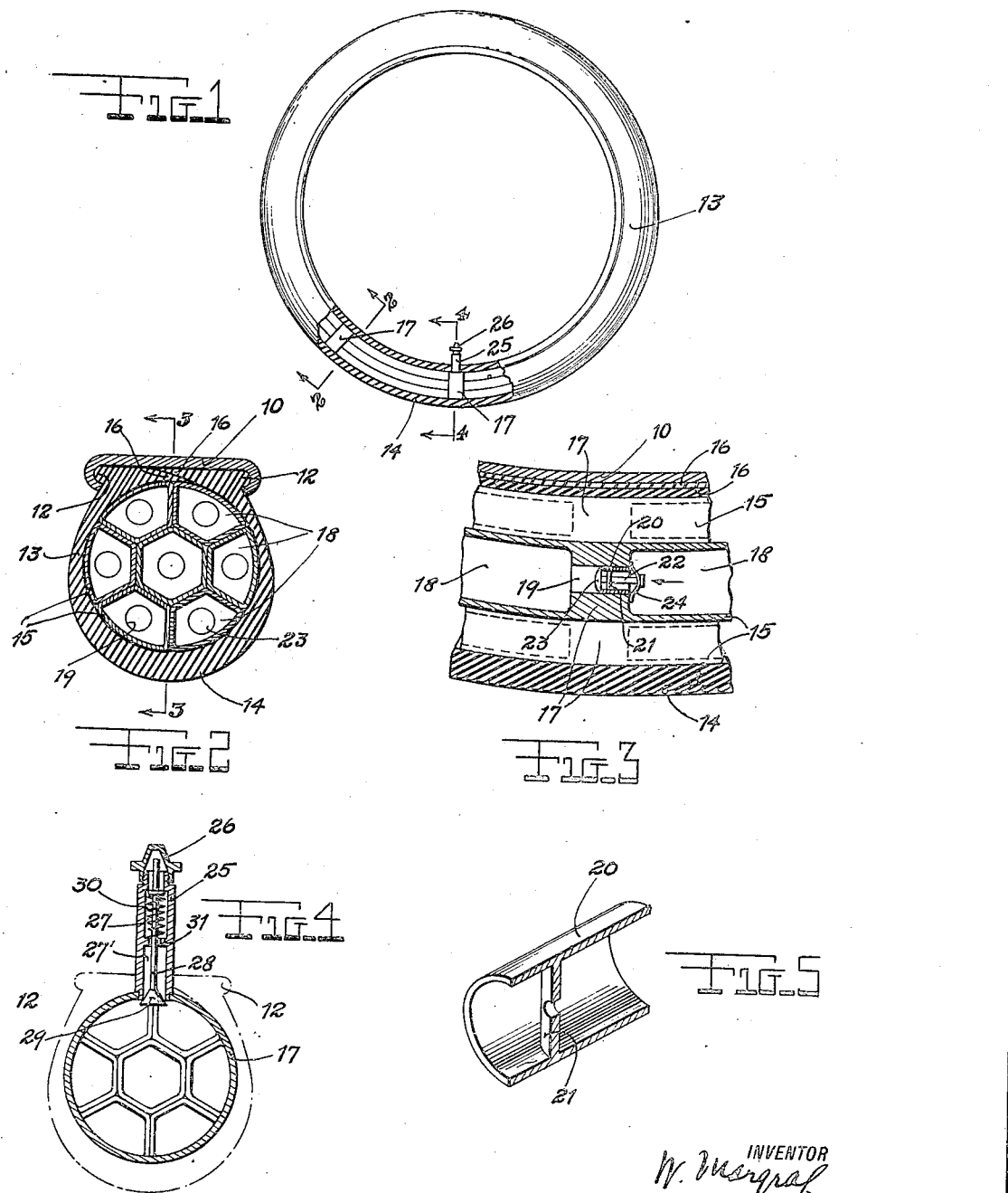

1,442,436

UNITED STATES PATENT OFFICE.

WILLIAM MARGRAF, OF BROOKLYN, NEW YORK.

PNEUMATIC TIRE.

Application filed September 23, 1921. Serial No. 502,668.

*To all whom it may concern:*

Be it known that I, WILLIAM MARGRAF, a citizen of Germany, residing at Brooklyn, in the county of Kings and State of New York, have invented certain new and useful Improvements in Pneumatic Tires, of which the following is a specification.

This invention has for its main object the provision of a pneumatic tire which may sustain punctures and still retain a state of resiliency.

Another object is to provide a chambered pneumatic tire composed of a number of compartments, each connected with others by suitable valves, the entire series being connected to a main valve through which they are inflated.

The above and other objects will become apparent in the following description, references being made to the annexed drawing in which:—

Figure 1 is a side elevational view of an automobile tire made in accordance with the invention.

Figure 2 is a cross sectional view taken on line 2—2 of Figure 1, drawn to an enlarged scale.

Figure 3 is a longitudinal sectional view taken on line 3—3 of Figure 1 showing the valves connecting adjacent compartments.

Figure 4 is a cross sectional view taken on line 4—4 of Figure 1 showing the main valve in detail.

Figure 5 is a perspective view of the valve sleeve, shown in longitudinal section.

Referring more in detail to the drawing, the numeral 10 indicates a standard form of channeled metallic wheel rim, used on most classes of present type automobiles, having curved lateral flanges 11 forming recesses adapted to receive the beadings 12 of the tire 13 in such a manner that when pressure is exerted from within the tire, the tendency to retain the beadings in the recesses will be proportionately increased.

The traction surface or tread 14 of the tire shoe is preferably made of relatively heavy or tough rubber and is proportionately greater in thickness than the side walls, the life of the tire depending on this factor.

The outer tire 13 is provided with slender taper-ends 16, which, when retained by the beadings 12 in the rim, will overlap to form a dust and water proof joint.

Located in the tire 13 are a plurality of interadjacent tubes 15 filling its entire chamber. The tubes can be of any number, size or shape and are necessarily made of soft pliable rubber of great elasticity. In Figures 2 and 4 a series of tubes are shown arranged in so called honey comb formation. Each tube contains a series of spaced transverse separating walls 17 forming a plurality of compartments 18.

The walls 17 have holes 19 in which are secured metallic sleeves 20, each having a bridge 21 containing a centrally disposed opening through which passes a valve stem 22, having a valve head 23 at one end engaging one of the sleeves. The opposite end of the stem 22 has secured upon it a collar 22' adapted to retain a curved leaf spring 24 in yieldable contact with the corresponding end of the sleeve.

In order to inflate the chamber with air, a main valve is provided comprising a cylindrical body 25, a screw-threaded protective cap 26 surmounting the same. When the cap 26 is removed, a pump may be connected to the body and air is forced into the chambers 27 and 27'; after depressing the collar 28' fixed to the stem rod 28, the air passes the valve head 29, which is kept in yieldable contact with the lower-most opening of the body 25 by a coiled expansion spring 30, retained between the collar 28' and a collar 31 formed in the body 25.

The compartments 18 of the tubes 15, adjacent the main valve are joined to each other so that each tube has the same initial pressure of air.

As the pumping proceeds, the excess pressure in the compartments will open the valves in each separating wall in succession, until the entire series of tubes are filled to the desired pressure, after which the pump can be detached and the protective cap replaced.

From the foregoing it is obvious that if any compartment becomes ruptured or punctured, the remaining compartments will not be affected but will still retain, approximately, their original buoyancy.

It is also obvious that various combinations and arrangements of the pneumatic compartments may be provided in addition to that which have been shown without departing from the spirit and scope of the invention.

Having thus described my invention and set forth the manner of its construction and application, what I claim as new and desire to secure by Letters Patent, is:—

A tire comprising an outer casing, an endless tube having hexagonal walls disposed centrally in said casing, other tubes interjacent said casing enveloping said central tube, the angular side walls of said other tubes being radial, transverse partitions in all of said tubes forming a plurality of independent compartments, said partitions being relatively thick and disposed in register one with another, check valves in said partitions whereby each compartment may be successively filled with air, and means for admitting compressed air thereto.

In witness whereof I affix my signature.

WILLIAM MARGRAF.